United States Patent
Dingler et al.

(10) Patent No.: US 11,886,342 B2
(45) Date of Patent: Jan. 30, 2024

(54) AUGMENTING CACHE REPLACEMENT OPERATIONS

(71) Applicant: INTERNATIONAL BUSINESS MACHINES CORPORATION, Armonk, NY (US)

(72) Inventors: Aaron Dingler, Austin, TX (US); Mohit Karve, Austin, TX (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/457,135

(22) Filed: Dec. 1, 2021

(65) Prior Publication Data

US 2023/0169001 A1 Jun. 1, 2023

(51) Int. Cl.
*G06F 12/08* (2016.01)
*G06F 12/12* (2016.01)
*G06F 12/0811* (2016.01)
*G06F 12/122* (2016.01)
*G06F 12/0891* (2016.01)

(52) U.S. Cl.
CPC ...... *G06F 12/0811* (2013.01); *G06F 12/0891* (2013.01); *G06F 12/122* (2013.01)

(58) Field of Classification Search
CPC . G06F 12/0811; G06F 12/0891; G06F 12/122
See application file for complete search history.

(56) References Cited

U.S. PATENT DOCUMENTS

| 7,461,207 | B2 | 12/2008 | Magoshi |
| 7,757,045 | B2 | 7/2010 | Shannon |
| 10,031,847 | B2 | 7/2018 | Zhang |
| 11,106,599 | B2 | 8/2021 | Zhang |
| 11,106,601 | B2 | 8/2021 | Dolev |

(Continued)

FOREIGN PATENT DOCUMENTS

| CN | 101236530 A | 8/2008 |
| CN | 101866318 A | 10/2010 |

OTHER PUBLICATIONS

Al-Zoubi, H. et al., "Performance Evaluation of Cache Replacement Policies for the SPEC CPU2000 Benchmark Suite," ACMSE'04, Apr. 2-3, 2004, pp. 267-272, US.

(Continued)

*Primary Examiner* — Masud K Khan
(74) *Attorney, Agent, or Firm* — Jared C. Chaney

(57) ABSTRACT

A method, system, and computer program product for augmenting cache replacement operations are provided. The method identifies a set of cache lines within a first cache level of a multilevel cache. A first candidate cache line is identified based on a first replacement scheme of the first cache level. A second candidate cache line is identified based on the first replacement scheme of the first cache level. A replacement cache line is selected for replacement in the first cache level. The replacement cache line is selected from the first candidate cache line and the second candidate cache line and based on the first replacement scheme of the first cache level and a second replacement scheme of a second cache level. The method removes the replacement cache line from the first cache level.

20 Claims, 6 Drawing Sheets

(56) References Cited

U.S. PATENT DOCUMENTS

| | | | |
|---|---|---|---|
| 2011/0055529 A1* | 3/2011 | McDonald | G06F 9/3806 712/240 |
| 2013/0007373 A1 | 1/2013 | Beckmann | |
| 2013/0297876 A1* | 11/2013 | Yu | G06F 12/126 711/E12.043 |
| 2013/0297882 A1 | 11/2013 | Yamamoto | |
| 2016/0055100 A1 | 2/2016 | Loh | |
| 2017/0357446 A1* | 12/2017 | Moyer | G06F 12/0891 |
| 2018/0052781 A1 | 2/2018 | Nakra | |
| 2018/0173636 A1* | 6/2018 | Reed | G06F 12/123 |
| 2019/0079877 A1* | 3/2019 | Gaur | G06F 12/0811 |
| 2020/0210347 A1* | 7/2020 | Tian | G06F 12/123 |
| 2020/0327070 A1* | 10/2020 | Byun | G06F 12/126 |

OTHER PUBLICATIONS

Anonymous, "A Method and System for Enabling Concurrent Access and Replacement of Cache Entries within the Same Congruence Class in an N-way Set Associative Cache," IP.com Prior Art Database, IPCOM000238477D, Aug. 27, 2014, 5 pages.

Anonymous, "Hybrid Cache Eviction Policy for Near Caches in Spatially Distributed Cache Platforms," IP.com Prior Art Database, IPCOM000234682D, Jan. 28, 2014, 4 pages.

Anonymous, "Method and Apparatus for Dynamic Cache Bypass and Insertion," IP.com Prior Art Database, IPCOM000223644D, Nov. 20, 2012, 7 pages.

Dybdahl et al., "An LRU-based Replacement Algorithm Augmented with Frequency of Access in Shared Chip-Multiprocessor Caches," ACM SIGARCH Computer Architecture News, Sep. 2007, pp. 46-52, vol. 35, No. 4.

Keramidas, G. et al., "Cache Replacement Based Reuse-Distance Prediction," ResearchGate Conference Paper, Nov. 2007, 7 pages.

Kirner, R., 8th International Workshop on Worst-Case Execution Time (WCET) Analysis, 2008 WCET Abstracts Collection, Jul. 1, 2008, 165 pages, vol. 8, Saarbrucken/Wadern, Germany.

Mell et al., "The NIST Definition of Cloud Computing", Recommendations of the National Institute of Standards and Technology, NIST Special Publication 800-145, Sep. 2011, 7 pages.

International Search Report and Written Opinion dated Dec. 21, 2022, for International Application No. PCT/CN2022/123750, filed Oct. 8, 2022.

* cited by examiner

AUGMENTING CACHE REPLACEMENT OPERATIONS

BACKGROUND

Multilevel caches enable passage of cache lines between cache levels. Multilevel cache architectures are often established with a cache hierarchy. Higher level caches within a cache hierarchy are often comparatively smaller than lower level caches. When a higher level cache is full and is to receive additional data, cache lines within the higher level cache are often passed to lower level caches.

SUMMARY

According to an embodiment described herein, a computer-implemented method for augmenting cache replacement operations is provided. The method identifies a set of cache lines within a first cache level of a multilevel cache. A first candidate cache line is identified based on a first replacement scheme of the first cache level. A second candidate cache line is identified based on the first replacement scheme of the first cache level. A replacement cache line is selected for replacement in the first cache level. The replacement cache line is selected from the first candidate cache line and the second candidate cache line and based on the first replacement scheme of the first cache level and a second replacement scheme of a second cache level. The method removes the replacement cache line from the first cache level.

According to an embodiment described herein, a system for augmenting cache replacement operations is provided. The system includes one or more processors and a computer-readable storage medium, coupled to the one or more processors, storing program instructions that, when executed by the one or more processors, cause the one or more processors to perform operations. The operations identify a set of cache lines within a first cache level of a multilevel cache. A first candidate cache line is identified based on a first replacement scheme of the first cache level. A second candidate cache line is identified based on the first replacement scheme of the first cache level. A replacement cache line is selected for replacement in the first cache level. The replacement cache line is selected from the first candidate cache line and the second candidate cache line and based on the first replacement scheme of the first cache level and a second replacement scheme of a second cache level. The operations remove the replacement cache line from the first cache level.

According to an embodiment described herein, a computer program product for augmenting cache replacement operations is provided. The computer program product includes a computer-readable storage medium having program instructions embodied therewith, the program instructions being executable by one or more processors to cause the one or more processors to identify a set of cache lines within a first cache level of a multilevel cache. A first candidate cache line is identified based on a first replacement scheme of the first cache level. A second candidate cache line is identified based on the first replacement scheme of the first cache level. A replacement cache line is selected for replacement in the first cache level. The replacement cache line is selected from the first candidate cache line and the second candidate cache line and based on the first replacement scheme of the first cache level and a second replacement scheme of a second cache level. The computer program product removes the replacement cache line from the first cache level.

DETAILED DESCRIPTION

Figure 1:
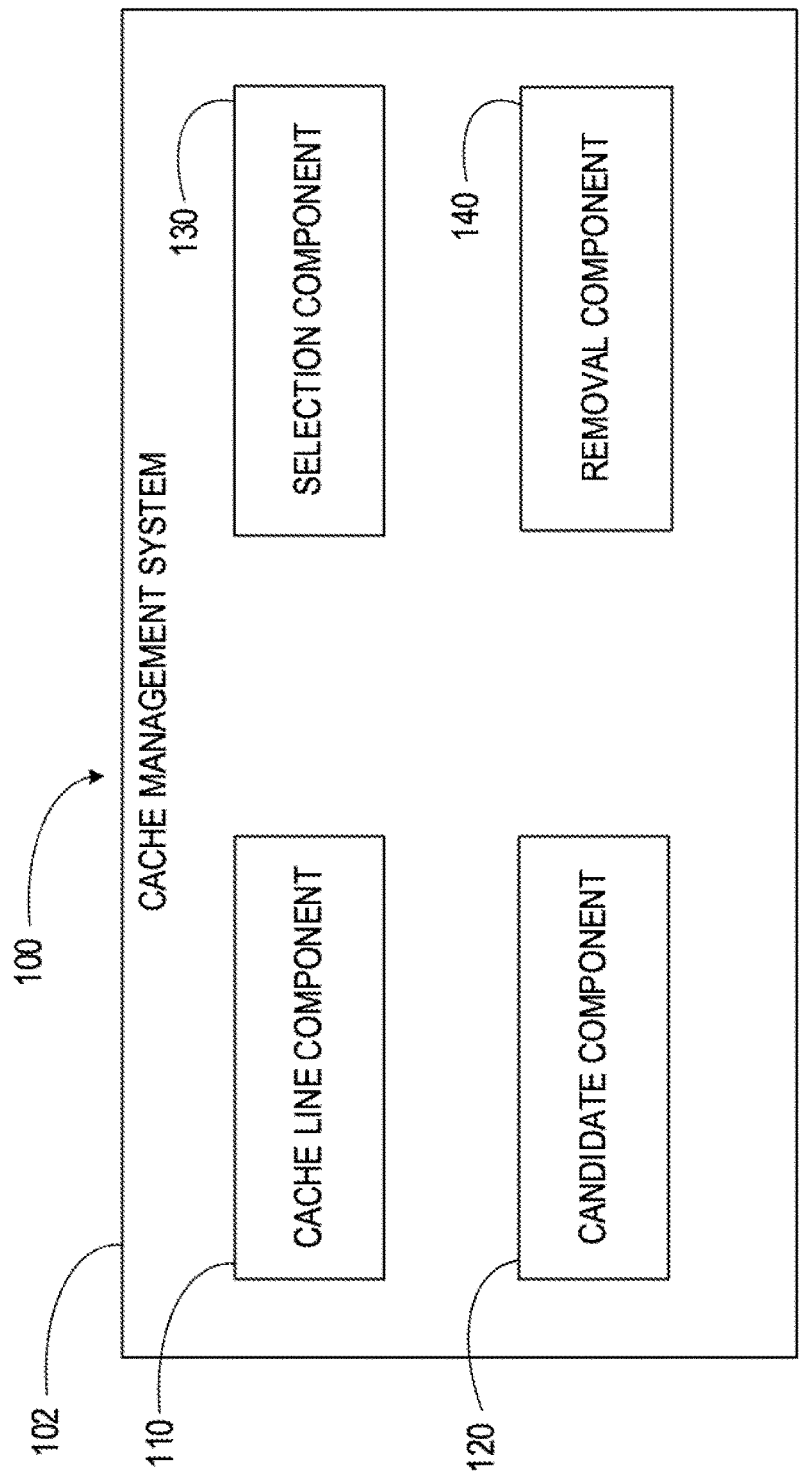
FIG. 1 depicts a block diagram of a computing environment for implementing concepts and computer-based methods, according to at least one embodiment.

The present disclosure relates generally to methods for augmenting cache replacement operations. More particularly, but not exclusively, embodiments of the present disclosure relate to a computer-implemented method for augmenting cache replacement decisions in a high level cache in a multilevel cache with replacement information from a lower level cache in the multilevel cache. The present disclosure relates further to a related system for augmenting cache replacement operations, and a computer program product for operating such a system.

Multilevel caches enable passage of cache lines between cache levels. Multilevel cache architectures are often established with a cache hierarchy. Higher level caches within a cache hierarchy are often comparatively smaller than lower level caches. When a higher level cache is full and is to receive additional data, cache lines within the higher level cache are often passed to lower level caches. Cache levels may employ algorithms to determine relative values for cache lines stored within each cache. Each cache level generally determines whether to retain or remove a cache line based on the cache management algorithm contained therein.

An example of a cache management algorithm is a counter-based least recently used (CBLRU) algorithm. The CBLRU algorithm assigns relative value to cache lines. The relative value of these cache lines may be established based on recency of use, a type of operation that resulted in the cache line's installation, frequency of use, and other relevant characteristics. Cache lines with lower counter values subject the cache lines to replacement within the cache. A low or lowest counter value may indicate to the algorithm that the cache line is not or is no longer valuable for retention in the cache. For example, a CBLRU counter may be designed to indicate how valuable the cache line is to a cache level. CBLRU values are typically increased when a line is passed up from a lower level to a higher level. Increasing the CBLRU values may indicate the line was used recently and should be kept in the relevant cache level implementing the CBLRU algorithm. Higher levels or CBLRU counts may indicate that a cache line should be kept in a lower level cache implementing the CBLRU algorithm when the cache line is removed from a higher level cache. Within the cache level implementing the CBLRU algorithm, the value or count may eventually decay such that lower value cache lines age out of the cache level and are sent to another memory device or a further lower cache level. Lines with a high CBLRU value when passed from a lower level cache to a higher level cache may indicate that the cache line was recently removed from the higher level cache and then requested again.

In some implementations of multilevel cache architectures, a lower level cache may implement the CBLRU algorithm and a portion of the information generated from the CBLRU algorithm may be accessible to higher level caches. In those implementations, some of the CBLRU data is maintained in a lower level cache as cache lines are passed between a higher level cache and the lower level cache. The CBLRU data may be used to determine values within the lower level cache as the cache lines may originate in the higher level cache. The CBLRU algorithm may increment counters on the cache line references or other events. In such implementations, the CBLRU data is not used in the higher level cache's replacement or cache management decisions.

Embodiments of the present disclosure enables use of replacement scheme data from differing cache levels to augment decision making in other cache levels. Some embodiments of the present disclosure enable a multilevel cache to use CBLRU data from lower cache levels to augment decision making in higher cache levels to improve cache hit rates and cache performance. Embodiments of the present disclosure use CBLRU data from lower level caches to augment removal decisions of higher level caches. In some embodiments, when a higher level cache is performing a replacement decision, the CBLRU value of the line is compared to a threshold. The threshold may be established in the lower level cache. In such embodiments, where the CBLRU value of the line exceeds the threshold and a replacement candidate with a lower CBLRU value below the threshold exists, the line is passed over and the latter candidate is selected for replacement within the higher level cache. In some embodiments, the threshold value is programmable based on workload. In some embodiments, the threshold value is set by the lower level cache. In some embodiments, a maximum skip value is established to limit a number of times that a single cache line may escape replacement. Embodiments of the present disclosure improve hit rates for higher level cache and overall performance improvements to relevant computer systems.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a cache management system 102. The cache management system 102 may comprise a cache line component 110, a candidate component 120, a selection component 130, and a removal component 140. The cache line component 110 identifies sets of cache lines within differing levels of cache within a multilevel cache architecture. The candidate component 120 identifies candidate cache lines, within one or more cache levels, for removal by the cache management system 102. The selection component 130 selects replacement cache lines from identified candidate cache lines based on replacement schemes of a plurality of cache levels of the multilevel cache architecture. The removal component 140 removes selected replacement cache lines from one cache level to another. Although described with distinct components, it should be understood that, in at least some embodiments, components may be combined or divided, and/or additional components may be added without departing from the scope of the present disclosure.

Figure 2:
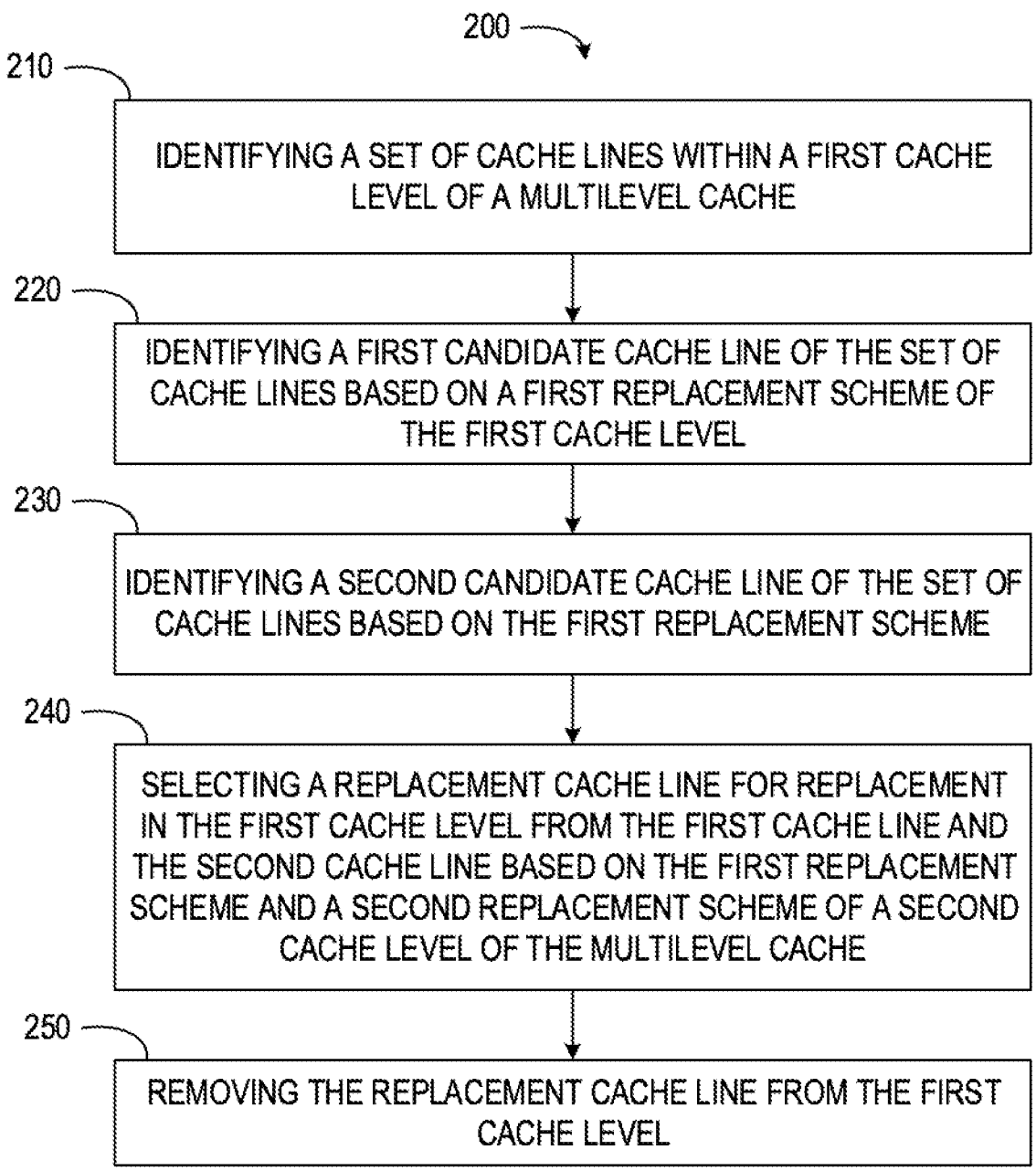
FIG. 2 depicts a flow diagram of a computer-implemented method for augmenting cache replacement operations, according to at least one embodiment.

Referring now to FIG. 2, a flow diagram of a computer-implemented method 200 is shown. The computer-implemented method 200 is a method for augmenting cache replacement operations. In some embodiments, the computer-implemented method 200 may be performed by one or more components of the computing environment 100, as described in more detail below.

At operation 210, the cache line component 110 identifies a set of cache lines within a first cache level. In some embodiments, the first cache level is part of a multilevel cache. The set of cache lines may be stored in the first cache level. The first cache level may be a high level cache. The high level cache may have limited storage space or memory allocation and may be configured for faster access than lower level caches within the multilevel cache.

The cache line component 110 may identify the set of cache lines by periodically accessing the first cache level. The set of cache lines may be identified based on a trigger condition. The trigger condition may indicate that memory associated with the first cache level is full or approaching a full status. The trigger condition may indicate that new cache lines are to be stored on the first cache level. Although discussed with reference to specific examples, it should be understood that the cache line component 110 may access or identify the set of cache lines within the first cache level based on any suitable trigger, operation, or circumstance.

At operation 220, the candidate component 120 identifies a first candidate cache line of the set of cache lines. The first candidate cache line is identified based on a first replacement scheme. In some embodiments, the first candidate cache line is identified based on a relative value of the cache line to the first cache level. The relative value may be calculated or determined using the first replacement scheme. The first cache replacement scheme may be a replacement scheme of the first cache level. The first replacement scheme may be a mechanism informing replacement of cache lines when the first cache level approaches or meets a capacity of that cache within the multilevel cache. The first cache replacement scheme may be an algorithm determining selection for candidate cache lines as least frequently used, pseudo-least frequently used (LRU), CBLRU, or any other suitable cache replacement scheme. For example, the first candidate cache line may be a least recently used cache line within the first cache level, where the first replacement scheme is a least recently used replacement scheme.

In some embodiments, each cache level of the multilevel cache may have a replacement scheme. In some embodiments, the first replacement scheme of the first cache level differs from the second replacement scheme of the second cache level. The first replacement scheme may be least frequently used, pseudo-least frequently used (LRU), CBLRU, or any other suitable cache replacement scheme, while the second replacement scheme may be another suitable replacement scheme. In some embodiments, the second replacement scheme is a counter-based least recently used (CBLRU) replacement scheme.

At operation 230, the candidate component 120 identifies a second candidate cache line of the set of cache lines. The second candidate cache line may be identified based on the first replacement scheme of the first cache level. The candidate component 120 may identify the second candidate cache line in a manner similar to that of operation 220. In some embodiments, the first candidate cache line is assigned a first value and the second candidate cache line is assigned a second value. The first value may indicate the first candidate cache line may be a least valuable cache line based on the first replacement scheme. The second value may indicate the second candidate cache line is a second least valuable cache line based on the first replacement scheme.

At operation 240, the selection component 130 selects a replacement cache line for replacement in the first cache level. The replacement cache line is selected from the first candidate cache line and the second candidate cache line. In some embodiments, the replacement cache line is selected based on the first replacement scheme of the first cache level and a second replacement scheme of a second cache level of the multilevel cache. In this way, the selection component 130 augments a cache replacement decision or operation within the first cache level with information from the second replacement scheme. For example, where the second replacement scheme is a CBLRU algorithm and the second cache level is a lower level cache, the selection component 130 augments a cache replacement decision with information from the CBLRU state of cache lines communicated from the lower level cache (e.g., the second cache level).

In some embodiments, the selection component 130 selects the replacement cache line by overriding an initial selection of the replacement cache line. In such embodiments, the selection component selects the first candidate cache line as the replacement cache line. The first candidate cache line is selected based on the first replacement scheme of the first cache level. In such embodiments, the first cache level makes the initial decision based on the first replacement scheme without input of the second replacement scheme. For example, the selection component 130 and the first cache level may track a recency of use for each cache line within the set of cache lines in the first cache level using the first replacement scheme. The selection component 130 may select the first candidate cache line as the replacement cache line as a least recently used cache line.

In response to the initial selection of the first candidate cache line as the replacement line, the selection component 130 accesses replacement data for the second replacement scheme for the second cache level. The selection component 130 may access the replacement data in response to selecting the first candidate cache line as the replacement cache line. In some embodiments, the selection component 130 accesses the replacement data in response to the first replacement scheme prompting selection of the first candidate cache line. Where the replacement data indicates the first candidate cache line is valuable, the selection component 130 may augment the selection of the first candidate cache line as the replacement cache line. For example, a valuable indicator within the replacement data may cause the selection component 130 to skip the first candidate cache line as the replacement cache line.

In some embodiments, the replacement data is a replacement threshold. In such instances, the selection component accesses the replacement data by identifying the replacement threshold for the second replacement scheme from the second cache level. The replacement threshold may indicate a relative value of a cache line to the second cache level based on the second replacement scheme. For example, the replacement threshold may have a value of 6 based on CBLRU data of the second cache level (e.g., the lower level cache). The second cache level may pass, provide, or otherwise make available the replacement threshold to the first cache level. In some instances, the second cache level provides the replacement threshold or replacement data to the first cache level continually, upon a change to the replacement data or replacement threshold, periodically, or in any other suitable time and manner.

In some embodiments, the selection component overrides selection of the first candidate cache based on the replacement data. In such embodiments, the selection component 130 overrides the selection of the first candidate cache line by performing a set of operations. The selection component 130 may initially identify a first replacement value for the first candidate cache line. For example, the first candidate cache line may be a cache line "M". The selection component 130 may identify the first replacement value for cache line "M" as a replacement value of "7", as shown in Table 1, below.

TABLE 1

| Cache Line | Recency | LL-CBLRU |
| --- | --- | --- |
| H | LRU-5 | 4 |
| I | LRU-3 | 5 |
| J | LRU-2 | 5 |
| K | LRU-1 | 5 |
| L | LRU-4 | 3 |
| M | LRU | 7 |
| N | MRU | 2 |

The selection component 130 may then identify a second replacement value for the second candidate cache line. For example, the second candidate cache line may be a cache line "K". The selection component 130 may identify the second replacement value for cache line "K" as a replacement value of "5", as shown in Table 1.

The selection component 130 may then compare the first replacement value for the first candidate with the replacement threshold. As in the example discussed above, the selection component 130 may compare the first replacement value of 7 with the replacement threshold of 6 to determine the first replacement value exceeds the replacement threshold. The selection component 130 may then compare the second replacement value for the second candidate with the replacement threshold. For example, the selection component may compare the second replacement value of 5 with the replacement threshold of 6 to determine the second replacement value is below the replacement threshold. The selection component 130 may then select the second candidate cache line as the replacement cache line based on the comparing the first replacement value and the second replacement value with the replacement threshold, thereby overriding the initial selection of the first candidate cache line as the replacement cache line. For example, since the first replacement value exceeds the replacement threshold, the first candidate cache line is indicated as being valuable under the second replacement scheme. The second candidate cache line having a value below the replacement threshold may indicate that the second candidate cache line is comparatively less valuable under the second replacement scheme.

In some embodiments, the candidate component 120 selects the candidate cache lines based, at least in part, on the replacement data or the replacement threshold. For example, where the candidate component 120 selects the first candidate cache line based on the first replacement scheme, the candidate component 120 may use the replacement data as an input to select the second candidate cache line. For example, the second candidate cache line may be selected as a cache line having a different replacement value than the first candidate cache line. By way of further example, where the first candidate cache line has the replacement value of 7, the candidate component 120 selects the second candidate cache line as a cache line having a replacement value below the replacement value of the first candidate cache line.

In some instances, the second candidate cache line is selected as a first available cache line of the set of cache lines having a replacement value that is different from the replacement value of the first candidate cache line. In some embodiments, the candidate component 120 may review and select candidate cache lines at a variable depth. In such instances, the candidate component 130 may select one or more of the first candidate cache line and the second candidate cache line based, at least in part, on replacement data associated with those cache lines. In such instances, at least one candidate cache line, of the first candidate cache line and the second candidate cache line, may be selected such that a candidate cache line with a replacement value below the replacement value is available for selection by the selection component 130.

At operation 250, the removal component 140 removes the replacement cache line from the first cache level. The removal component 140 may remove the replacement cache line by passing the replacement cache line from the first cache level to the second cache level. In some instances, the removal component 140 removes the replacement cache line by erasing or marking the portion of memory as available once the replacement cache line has been moved to a lower level cache of the multilevel cache.

Figure 3:
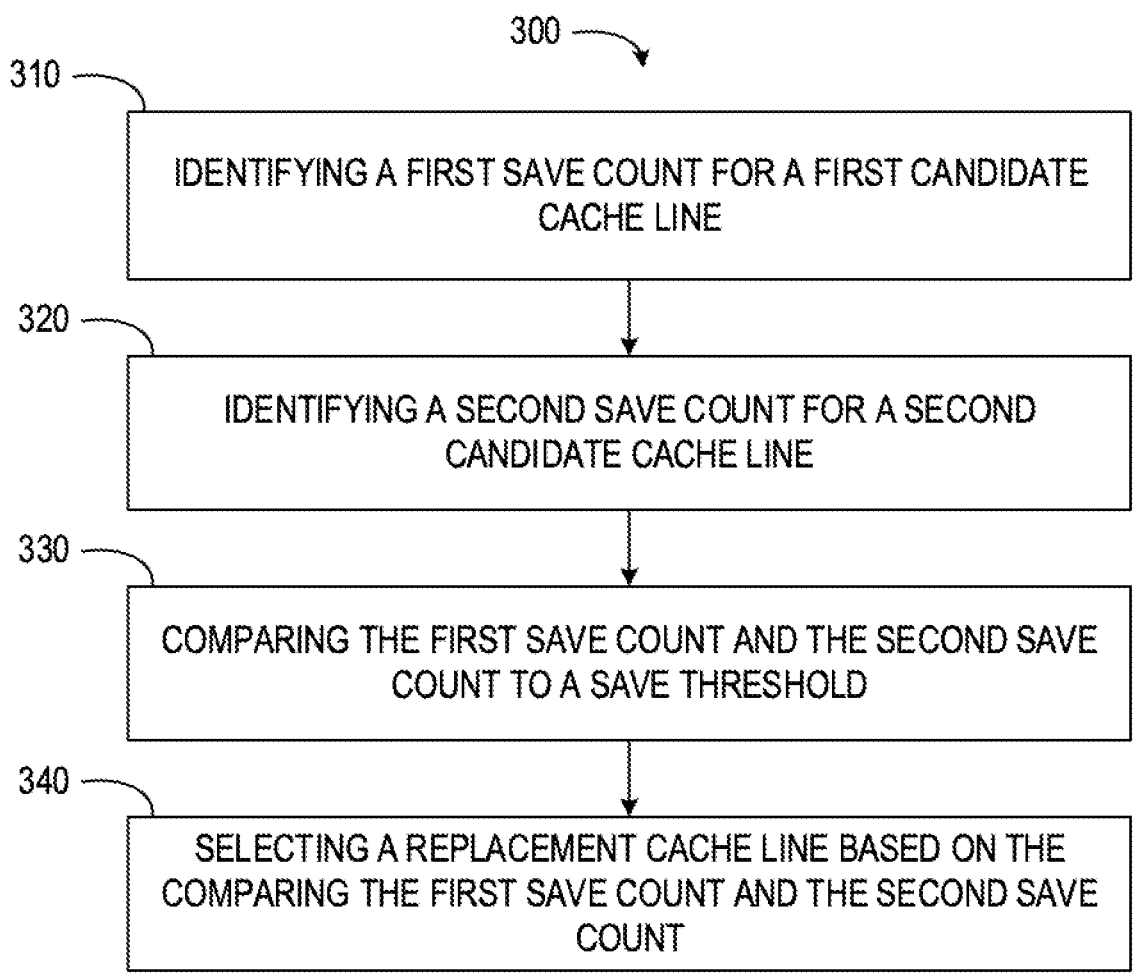
FIG. 3 depicts a flow diagram of a computer-implemented method for augmenting cache replacement operations, according to at least one embodiment.

FIG. 3 shows a flow diagram of an embodiment of a computer-implemented method 300 for augmenting cache replacement operations. The method 300 may be performed by or within the computing environment 100. In some embodiments, the method 300 comprises or incorporates one or more operations of the method 200. In some instances, operations of the method 300 may be incorporated as part of or sub-operations of the method 200, such as operation 240.

In operation 310, the selection component 130 identifies a first save count for the first candidate cache line. The selection component 130 may identify the first save count within data or metadata associated with the first cache level. For example, a data table may be established for the first cache level indicating cache lines within the first cache level, a recency of use of each cache line, the save count for each cache line, and a removal value for each cache line. An example of the save count is shown below in Table 2.

TABLE 2

| Cache Line | Recency | Save Count | LL-CBLRU |
|---|---|---|---|
| H | LRU-5 | 0 | 4 |
| I | LRU-3 | 0 | 5 |
| J | LRU-2 | 0 | 5 |
| K | LRU-1 | 1 | 5 |
| L | LRU-4 | 0 | 3 |
| M | LRU | 2 | 7 |
| N | MRU | 0 | 2 |

A save count may be established within the first cache level for each cache line within the set of cache lines. When a cache line is initially inserted into the first cache level, the save count is initially set to zero. The save count for a cache line may be incremented each time that cache line is saved, skipped, overridden, or otherwise prevented from removal. For example, where a cache line is saved from removal by operation of the method 200, a save count for that cache line may be incremented. The first save count for the first candidate cache line may indicate a current number of times the first candidate cache line has been saved or prevented from being removed.

In operation 320, the selection component 130 identifies a second save count for the second candidate cache line. The second save count may indicate a number of times the second candidate cache line has been saved or prevented from removal from the first cache level. The selection component 130 may identify the second save count in a manner similar to or the same as described in operation 310.

In operation 330, the selection component 130 compares the first save count and the second save count to a save threshold. The save threshold may indicate a maximum number of times a cache line can be saved. The save threshold may prevent a cache line from escaping removal without being of use or relevant to the first cache level. In some instances, the save threshold may be a threshold for the second replacement scheme. In such instances, the save threshold may be established dynamically, based on use of cache lines and movement of cache lines between the first cache level and the second cache level. In some instances, the save threshold is established for the cache management system 102. In such instances, the save threshold may be preestablished prior to operations of the method 200 or the method 300 being performed.

In operation 340, the selection component 130 selects the replacement cache line based on the comparing the first save count and the second save count. The selection component 130 may select the replacement cache, at least in part, based on the save count threshold and the save counts of the first candidate cache line and the second candidate cache line. For example, the selection component 130 may initially select the second candidate cache line as the replacement cache line. Where the first save count is greater than the second save count, the selection component 130 may override the initial selection and re-select the first candidate cache line as the replacement cache line. As discussed in the previous examples, cache lines M and K may be selected as candidate cache lines, with a replacement threshold of 6. M may have a replacement value of 7 and K may have a replacement value of 5. The selection component 130 may initially select K as the replacement cache line. However, since cache line M has been saved twice, the selection component 130 may select the first cache line (e.g., cache line M) for replacement where the save threshold is 2.

In some embodiments, the selection component 130 prioritizes selection of the replacement cache line based on the first replacement scheme and the second replacement scheme. The selection component 130 may then augment selection of the replacement cache line with the save threshold and the save counts of the respective candidate cache lines. In some instances, the selection component 130 compares the save counts of the respective candidate cache lines to the save threshold where an initial selection decision is overridden based on the second replacement scheme.

Figure 4:
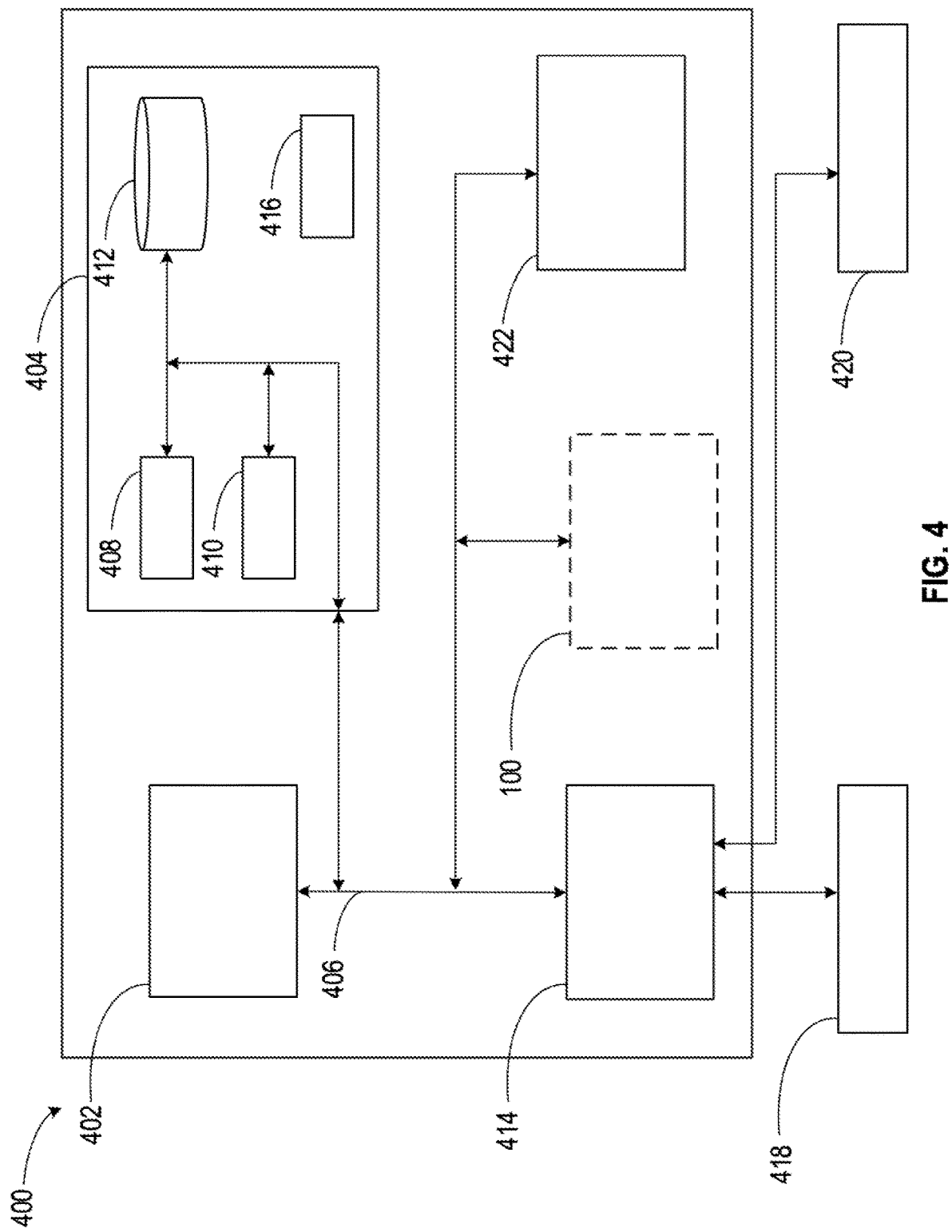
FIG. 4 depicts a block diagram of a computing system for augmenting cache replacement operations, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for augmenting cache replacement operations.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the cache line component 110, the candidate component 120, the selection component 130, and the removal component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
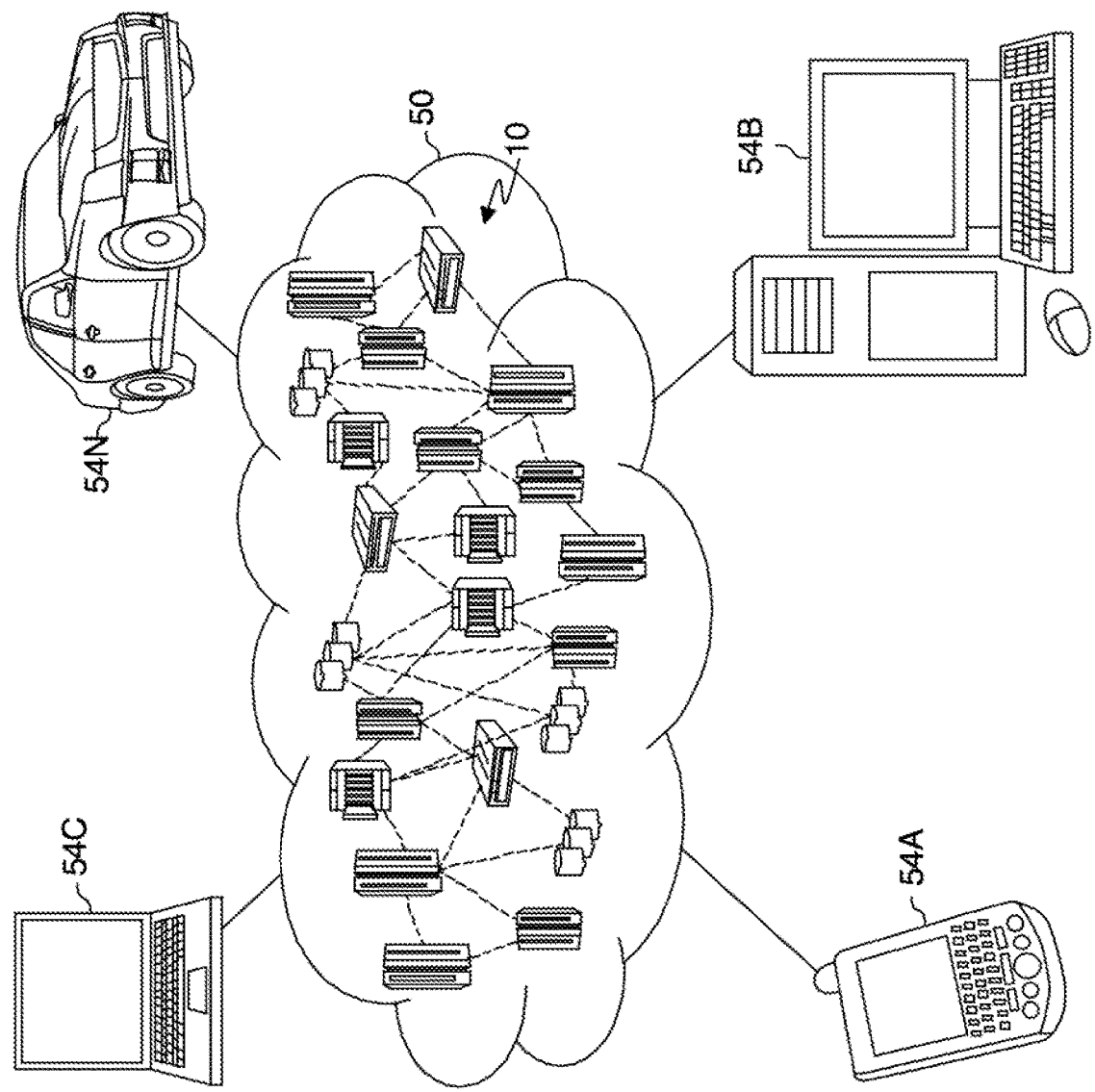
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
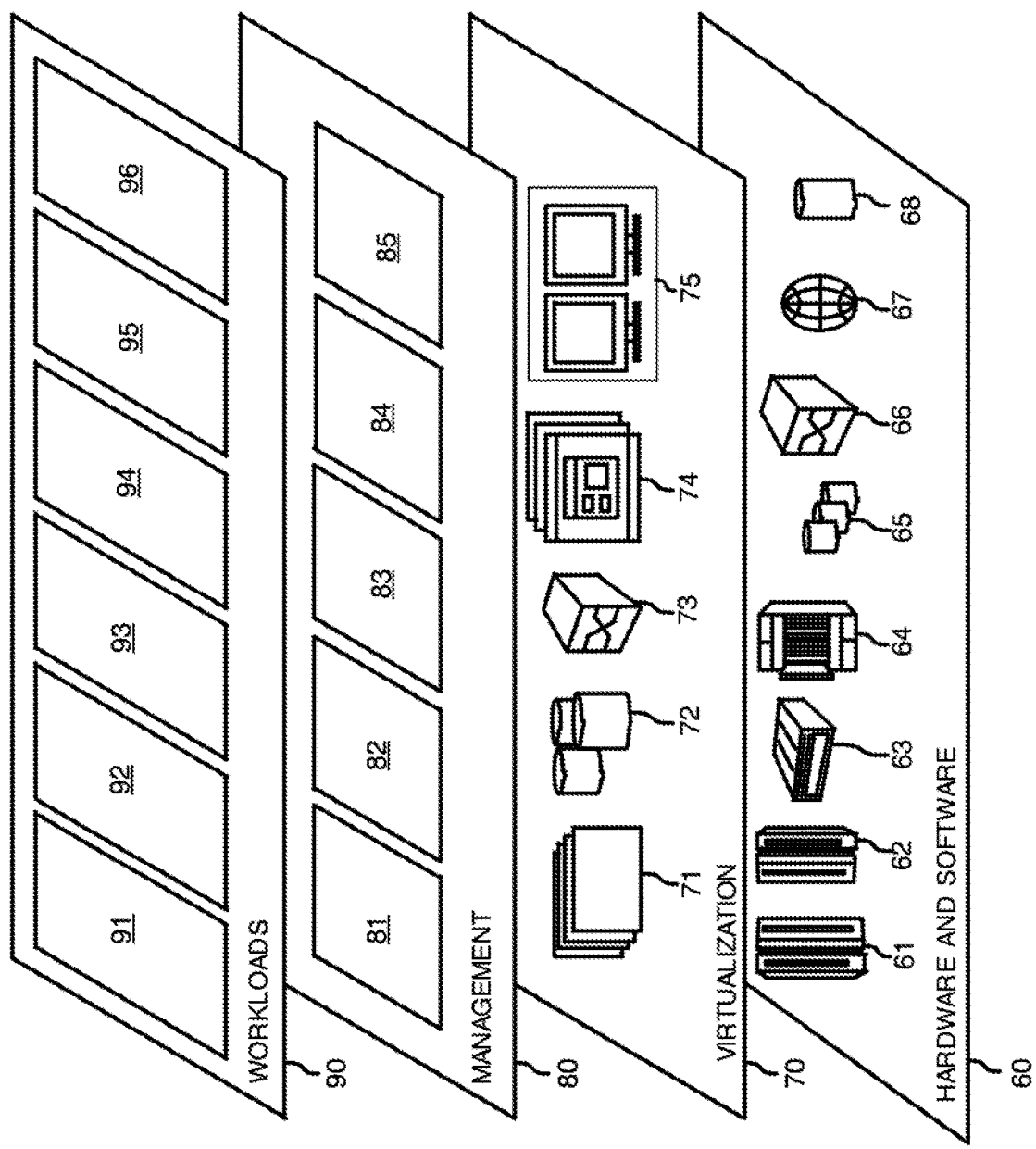
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cache line replacement processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a set of cache lines within a first cache level of a multilevel cache;
   identifying a first candidate cache line of the set of cache lines, the first candidate cache line identified based on a first replacement scheme of the first cache level;
   identify a second candidate cache line of the set of cache lines, the second candidate cache line identified based on the first replacement scheme of the first cache level, wherein the scheme indicates the first candidate cache line would be replaced before the second candidate cache line;
   selecting the second candidate cache line as a replacement cache line for replacement in the first cache level from the first candidate cache line and the second candidate cache line, the replacement cache line selected based on a second replacement scheme of a second cache level of the multilevel cache,
      wherein the first replacement scheme is different from the second replacement scheme; and
   removing the replacement cache line from the first cache level.

2. The method of claim 1, wherein the first replacement scheme of the first cache level differs from the second replacement scheme of the second cache level.

3. The method of claim 1, wherein the second replacement scheme is a counter-based least recently used replacement scheme.

4. The method of claim 1, wherein selecting the replacement cache line further comprises:
   selecting the first candidate cache line as the replacement cache line based on the first replacement scheme;
   accessing replacement data for the second replacement scheme from the second cache level; and
   overriding selection of the first candidate cache line based on the replacement data.

5. The method of claim 4, wherein accessing the replacement data further comprises:
   identifying a replacement threshold for the second replacement scheme from the second cache level.

6. The method of claim 5, wherein overriding the selection of the first candidate cache line further comprises:
   identifying a first replacement value for the first candidate cache line;
   identifying a second replacement value for the second candidate cache line;
   comparing the first replacement value for the first candidate cache line with the replacement threshold;
   comparing the second replacement value for the second candidate cache line with the replacement threshold; and selecting the second candidate cache line as the replacement cache line based on the comparing the first replacement value and the second replacement value with the replacement threshold.

7. The method of claim 1, wherein the method further comprises:
identifying a first save count for the first candidate cache line;
identifying a second save count for the second candidate cache line;
comparing the first save count and the second save count to a save threshold for the second replacement scheme; and
selecting the replacement cache line based on the comparing the first save count and the second save count.

8. A system, comprising:
one or more processors; and
a computer-readable storage medium, coupled to the one or more processors, storing program instructions that, when executed by the one or more processors, cause the one or more processors to perform operations comprising:
identifying a set of cache lines within a first cache level of a multilevel cache;
identifying a first candidate cache line of the set of cache lines, the first candidate cache line identified based on a first replacement scheme of the first cache level;
identifying a second candidate cache line of the set of cache lines, the second candidate cache line identified based on the first replacement scheme of the first cache level wherein the scheme indicates the first candidate cache line would be replaced before the second candidate cache line;
selecting the second candidate cache line as a replacement cache line for replacement in the first cache level from the first candidate cache line and the second candidate cache line, the replacement cache line selected based on a second replacement scheme of a second cache level of the multilevel cache,
wherein the first replacement scheme is different from the second replacement scheme; and
removing the replacement cache line from the first cache level.

9. The system of claim 8, wherein the first replacement scheme of the first cache level differs from the second replacement scheme of the second cache level.

10. The system of claim 8, wherein the second replacement scheme is a counter-based least recently used replacement scheme.

11. The system of claim 8, wherein selecting the replacement cache line further comprises:
selecting the first candidate cache line as the replacement cache line based on the first replacement scheme;
accessing replacement data for the second replacement scheme from the second cache level; and
overriding selection of the first candidate cache line based on the replacement data.

12. The system of claim 11, wherein accessing the replacement data further comprises:
identifying a replacement threshold for the second replacement scheme from the second cache level.

13. The system of claim 12, wherein overriding the selection of the first candidate cache line further comprises:
identifying a first replacement value for the first candidate cache line;
identifying a second replacement value for the second candidate cache line;
comparing the first replacement value for the first candidate cache line with the replacement threshold;
comparing the second replacement value for the second candidate cache line with the replacement threshold; and
selecting the second candidate cache line as the replacement cache line based on the comparing the first replacement value and the second replacement value with the replacement threshold.

14. The system of claim 8, wherein the operations further comprise:
identifying a first save count for the first candidate cache line;
identifying a second save count for the second candidate cache line;
comparing the first save count and the second save count to a save threshold for the second replacement scheme; and
selecting the replacement cache line based on the comparing the first save count and the second save count.

15. A computer program product comprising a computer readable storage medium having program instructions embodied therewith, the program instructions being executable by one or more processors to cause the one or more processors to perform operations comprising:
identifying a set of cache lines within a first cache level of a multilevel cache;
identifying a first candidate cache line of the set of cache lines, the first candidate cache line identified based on a first replacement scheme of the first cache level;
identifying a second candidate cache line of the set of cache lines, the second candidate cache line identified based on the first replacement scheme of the first cache level, wherein the scheme indicates the first candidate cache line would be replaced before the second candidate cache line;
selecting the second candidate cache line as a replacement cache line for replacement in the first cache level from the first candidate cache line and the second candidate cache line, the replacement cache line selected based on a second replacement scheme of a second cache level of the multilevel cache,
wherein the first replacement scheme is different from the second replacement scheme; and
removing the replacement cache line from the first cache level.

16. The computer program product of claim 15, wherein the second replacement scheme is a counter-based least recently used replacement scheme.

17. The computer program product of claim 15, wherein selecting the replacement cache line further comprises:
selecting the first candidate cache line as the replacement cache line based on the first replacement scheme;
accessing replacement data for the second replacement scheme from the second cache level; and
overriding selection of the first candidate cache line based on the replacement data.

18. The computer program product of claim 17, wherein accessing the replacement data further comprises:
identifying a replacement threshold for the second replacement scheme from the second cache level.

19. The computer program product of claim 18, wherein overriding the selection of the first candidate cache line further comprises:

identifying a first replacement value for the first candidate cache line;

identifying a second replacement value for the second candidate cache line;

comparing the first replacement value for the first candidate cache line with the replacement threshold;

comparing the second replacement value for the second candidate cache line with the replacement threshold; and selecting the second candidate cache line as the replacement cache line based on the comparing the first replacement value and the second replacement value with the replacement threshold.

20. The computer program product of claim 19, wherein the operations further comprise:

identifying a first save count for the first candidate cache line;

identifying a second save count for the second candidate cache line;

comparing the first save count and the second save count to a save threshold for the second replacement scheme; and selecting the replacement cache line based on the comparing the first save count and the second save count.

* * * * *